United States Patent [19]

Tuley

[11] 3,921,301
[45] Nov. 25, 1975

[54] MEASURING DEVICE
[76] Inventor: Dixon W. Tuley, 212 E. H St., Ontario, Calif. 91761
[22] Filed: June 12, 1974
[21] Appl. No.: 478,784

[52] U.S. Cl. ............................................. 33/141 R
[51] Int. Cl.² ............................................ G01B 3/12
[58] Field of Search ..................... 33/141 R, 141.5; 235/144 HC, 144 SM, 144 EA, 135, 139

[56] References Cited
UNITED STATES PATENTS

| 37,002 | 11/1862 | Lawrence | 33/141 R |
|---|---|---|---|
| 362,883 | 5/1887 | Dutemple | 33/141 R |
| 624,767 | 5/1899 | Ecker | 33/141 R |
| 1,544,626 | 7/1925 | Baldwin | 235/144 HC |
| 1,877,061 | 9/1932 | Schroll | 33/141 R |

Primary Examiner—Harry N. Haroian
Attorney, Agent, or Firm—Herbert E. Kidder

[57] ABSTRACT

Projecting from the bottom edge of a hand-held casing is a 2-inch circumference traversing wheel which drives three graduated number wheels: one for feet, one for inches, and one for fractions of an inch. A gear connection between the traverse wheel and fractions wheel drives the latter two revolutions for each revolution of the traverse wheel. An intermittent gear connection between traverse wheel and inch wheel advances the latter one inch-graduation with each half-turn of the traverse wheel. Another intermittent gear connection between inch wheel and foot wheel advances the latter one foot-graduation with each full revolution of the inch wheel. The inch wheel is mounted on a pivoted plate, which can be shifted to disengage the inch wheel from both the foot wheel and traverse wheel. A manually shiftable zero-return plate slidably mounted within the casing has cam surfaces that engage cam lobes on the number wheels, after the inch wheel has been disengaged, to reset the number wheels to zero. A spring connection between the zero-return plate and inch-wheel support plate allows the former to shift the support plate to the disengaged position, and then further movement of the zero-return plate resets the number wheels to zero.

7 Claims, 8 Drawing Figures

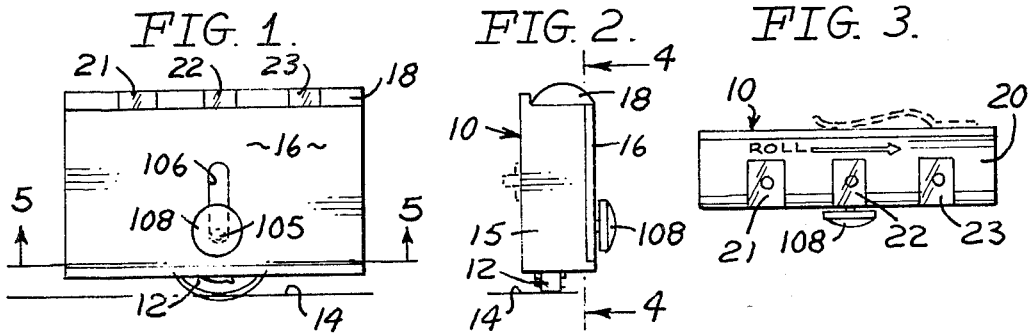
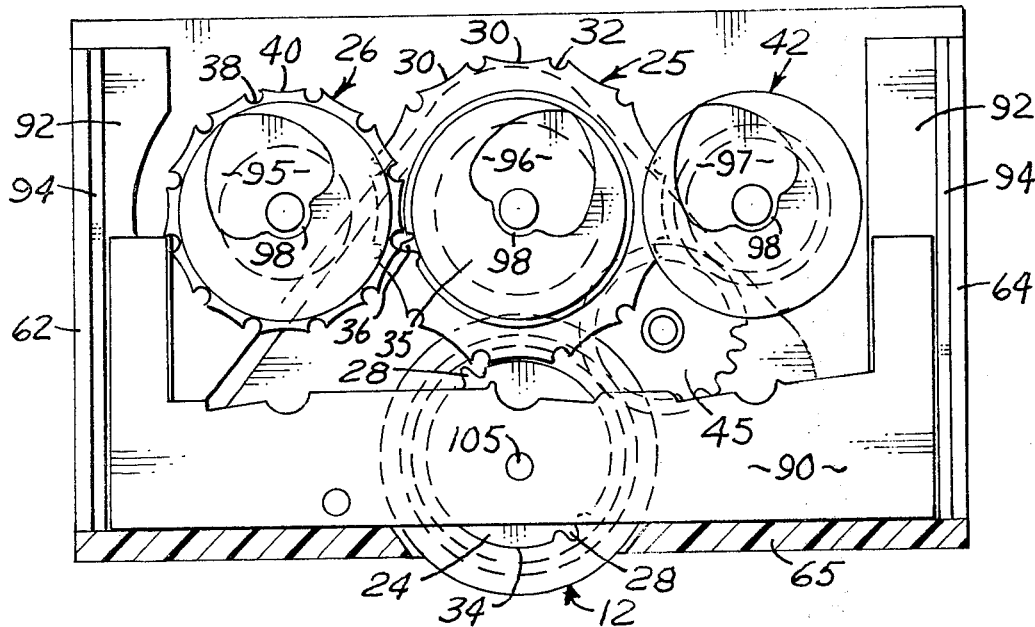
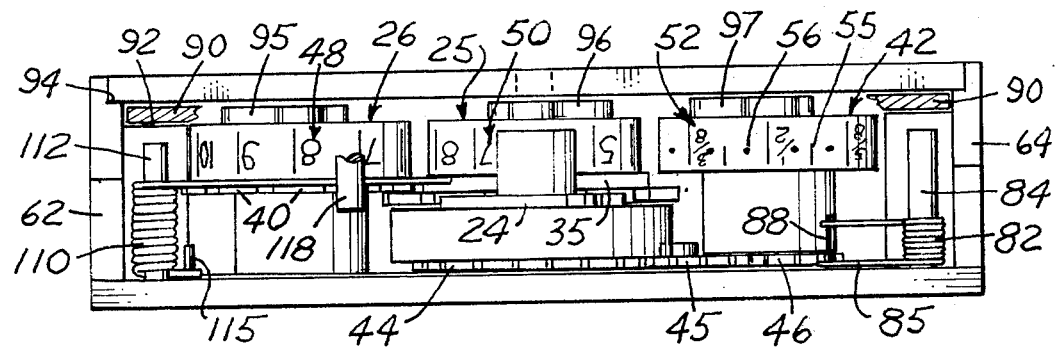

3,921,301

MEASURING DEVICE

BACKGROUND OF THE INVENTION:

The present invention pertains to measuring devices, and more particularly to a unit having a traversing wheel that is rolled over the surface to be measured, and which has indicia wheels that give a digital readout of the distance covered. The present invention is used in place of other more conventional measuring devices, such as steel tapes, folding extension rules, and the like.

Conventional measuring devices have a number of disadvantages and drawbacks. In the case of steel tapes, it usually requires two people to take a measurement over any distance exceeding 6 feet; one to hold the one end of the tape, and the other to hold the other end. Steel tapes of 12-foot length or longer are relatively heavy (e.g., a half-pound or more); and they are expensive. Another disadvantage is that only the first foot of length is graduated in sixteenths or thirty-seconds, while the remainder of the tape is graduated in eighths. Thus, it becomes difficult or impossible to measure distances over one foot with accuracy closer than one-eighth inch.

Folding extension rules also have some of the same disadvantages as steel tapes. For distances over 6 feet, it usually requires two people to handle the rule, with one at each end. Graduations are usually no smaller than one-eighth inch, except for the first foot of length. Also, folding rules are heavy and bulky. 12-inch rules are bulky and awkward to use, and must be moved along the surface to be measured in a step-by-step operation, which may result in considerable loss of accuracy in the process.

At the present time, there is one other measuring device on the market using a traversing wheel which is rolled along the surface to be measured, and this device is similar, at least in its mode of operation, to the present invention. In some respects, this prior device is an improvement over conventional measuring devices such as steel tapes, folding extension rules, and 12-inch rulers. However, this prior device is relatively expensive (e.g., about $8.00), which is due in part to the fact that it contains many parts that must be assembled by hand; and its design and construction are such that there is a great deal of backlash in the system, making it impossible to measure any distance with accuracy closer than about ¼-inch. This prior device is also relatively bulky and heavy, and lacking in precision and accuracy of readout.

SUMMARY OF THE INVENTION:

The primary object of the present invention is to provide a measuring device of the type described, comprising a case having a traversing wheel protruding from the bottom edge thereof and indicia wheels giving a digital readout of feet, inches, and fractions of an inch, which is simple and inexpensive to manufacture, with a minimum number of easily molded parts having no undercuts to complicate the mold design.

Another object of the invention is to provide a measuring device which is extremely accurate over its entire range, with a readout graduated down to thirty-seconds of an inch. While the preferred embodiment of the invention has a measurement range of from 0 to 12 feet, it can also be used to measure any desired distance by merely continuing to roll the device over the surface being measured, and keeping track of the number of complete revolutions made by the foot wheel. At the completion of the traverse, the number of complete revolutions of the foot wheel is multiplied by 12, and this is added to the readout showing on the indicia wheels.

A further object of the invention is to provide a measuring device that is compact, lightweight, and can be used to measure over irregular surfaces, around corners, and along curves, without losing any of its accuracy. The present device makes it easy to measure floors, walls, siding, etc., without effort. The device will also measure from inside corner to inside corner by merely adding the two-inch width of the casing to the readout showing on the indicia wheels.

These and other objects and advantages of the invention will become apparent to those skilled in the art from the following detailed description of the preferred embodiment thereof, with reference to the accompanying drawings.

BRIEF DESCRIPTION OF THE DRAWINGS:

FIG. 1 is a side elevation of the presently preferred embodiment of the invention;

FIG. 2 is an end elevation of the device;

FIG. 3 is a plan view of the device;

FIG. 4 is an enlarged cross section taken along line 4—4 of FIG. 2, showing the resetting plate and the three counting gears as well as the auxiliary low-order indicia wheel;

FIG. 5 is a bottom view of the device with the bottom wall of the casing removed;

Figure 6:
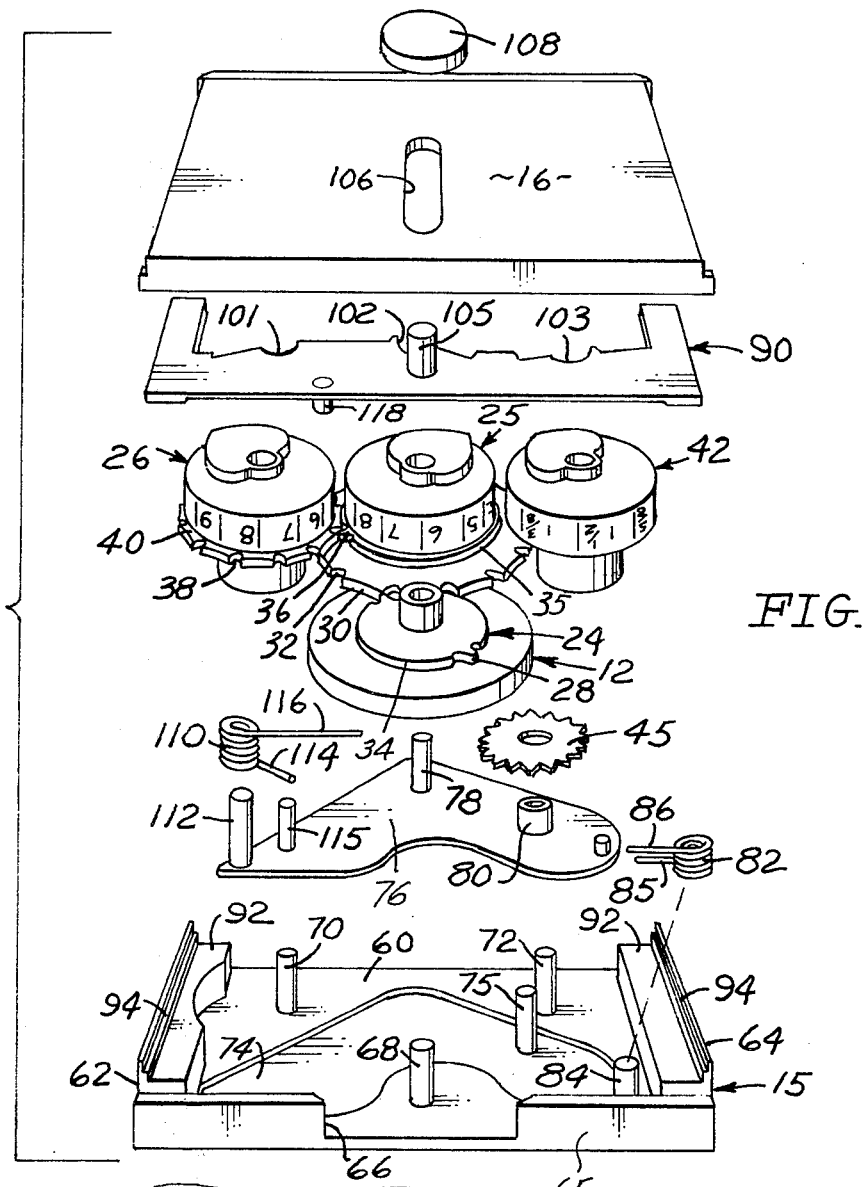
FIG. 6 is an exploded perspective view of the various parts of the measuring device.

DESCRIPTION OF THE PREFERRED EMBODIMENT:

As shown in FIGS. 1 and 2, the illustrated embodiment of the invention has a rectangular casing, generally designated 10, with a traversing wheel 12 protruding a short distance below the bottom of the casing for rolling action along a surfce 14 to measure a desired dimension along the surface. The casing 10 is molded in two parts, comprising a casing body 15 and a separate sidewall 16 with a top wall 18 integral therewith. At least the sidewall 16 and the top wall 18 of the casing are made of transparent plastic material, and the top wall 18 is of convex cross-section, as may be seen in FIG. 2, to serve as a magnifying lens. A thin opaque sheet 20 covers the top wall 18 and is cut away to form three windows 21, 22 and 23. At each of the three windows, the convex transparent material of the top wall 18 forms a lens element for magnifying corresponding digits or indicia that together represent the magnitude of a measured distance.

The rectangular casing 10 houses a counting gear train, comprising a low-order counting gear 24 integral with the traversing wheel 12, an intermediate-order counting gear 25 interlocked with the low-order counting gear, and a high-order counting gear 26 that is interlocked with the intermediate-order counting gear. The traversing wheel 12 is exactly two inches in circumference to measure two inches on each of its revolutions, and the low-order counting gear 24 that is integral with the traversing wheel has two diametrically opposite teeth 28 to drive the intermediate-order counting gear 25. The intermediate-order counting gear 25 is a Geneva gear with 12 circumferential subdivisions 30 separated by 12 peripheral notches 32 for engagement by the two teeth 28 of the low-order counting gear 24. In a well-known manner, each of the circumferential subdivisions 30 is of arcuate concave configuration to conform with and slidingly engage the circular edge 34 of the low-order counting gear 24 so as to immobilize the intermediate counting gear in the intervals between its incremental advances.

Integral with the intermediate counting gear 25 is a disc 35 with a single tooth 36 to drive the high-order counting gear 26. Here again, the high-order counting gear 26 is a Geneva gear with 12 notches 38, for engagement with the single tooth 36, and with 12 circumferential notches 40 which conform with and slidingly engage the circular periphery of the disc 35 so as to immobilize the gear 26 in the intervals between incremental advances.

What may be termed a low-order indicia wheel 42 is positioned adjacent the intermediate-order counting gear 25 and is driven by the traversing wheel 12 so that, in effect, the auxiliary low-order indicia wheel is driven by the low-order counting gear 24. For this purpose the traversing wheel 12 is provided on the side opposite counting gear 24 with a gear wheel 44 (see FIG. 5) that meshes with an idler gear 45 and the latter meshes, in turn, with a gear wheel 46 formed integrally with auxiliary low-order indicia wheel 42. There are twice as many teeth on gear wheel 46 as there are on the driving gear wheel 44, and indicia wheel 42 therefore makes two turns for each revolution of the traversing wheel 12.

The periphery of the high-order counting wheel 26 has 12 digits 48 (FIG. 5) representing feet of linear measurement, the digits being visible through the previously-mentioned magnifying window 21; the intermediate-order counting wheel 25 has a series of digits 50 representing inches of linear measurement, which digits are visible through the previously-mentioned window 22 of the casing.

The periphery of the indicia wheel 42 has a series of fractions 52 adjacent corresponding relatively long lines 54 that represent units of measurement of ⅛-inch, a series of relatively short lines 55 representing units of 1/16-inch, and a series of interposed dots 56 representing units of 1/32-inch. The indicia on the low-order indicia wheel 42 are visible through the third window 23. Thus the three windows 21, 22 and 23 combine to display the magnitude of a measured dimension in terms of feet, inches, and fractions of an inch down to 1/32-inch. The illustrated device has a measuring capacity of 12 feet with accuracy within 1/32 over the whole 12-foot range.

As shown in FIG. 6, the casing body 15, which is molded in one piece of plastic material, has a sidewall 60, two opposite end walls 62 and 64 and a bottom wall 65, the latter having an opening 66 through which traversing wheel 12 protrudes. Molded integrally with the sidewall 60 are an axle 68 for the traversing wheel 12, an axle 70 for high-order counting wheel 26 and an axle 72 for the auxiliary low-order indicia wheel 42.

The inner face of the sidewall 60 of the casing body is cut away to provide a shallow recess 74 of generally triangular configuration, and an axle 75 is integral with the side wall 60 within the area of the recess. The recess 74 provides a movable support plate 76 which carries an axle 78 for the intermediate counting gear 25. The recess 74 is sufficiently oversized relative to the support plate to give the support plate sufficient freedom for movement to carry the intermediate counting gear 25 out of engagement with both the low-order counting gear 24 and the high-order counting gear 26. The support plate 76 is pivotally mounted on axle 75, and for this purpose has a bore (not shown) to receive the axle, and is additionally provided with a short integral bushing sleeve 80 that rotatably embraces the axle. The previously-mentioned idler gear 45 is rotatably supported on sleeve 80.

Figure 7:
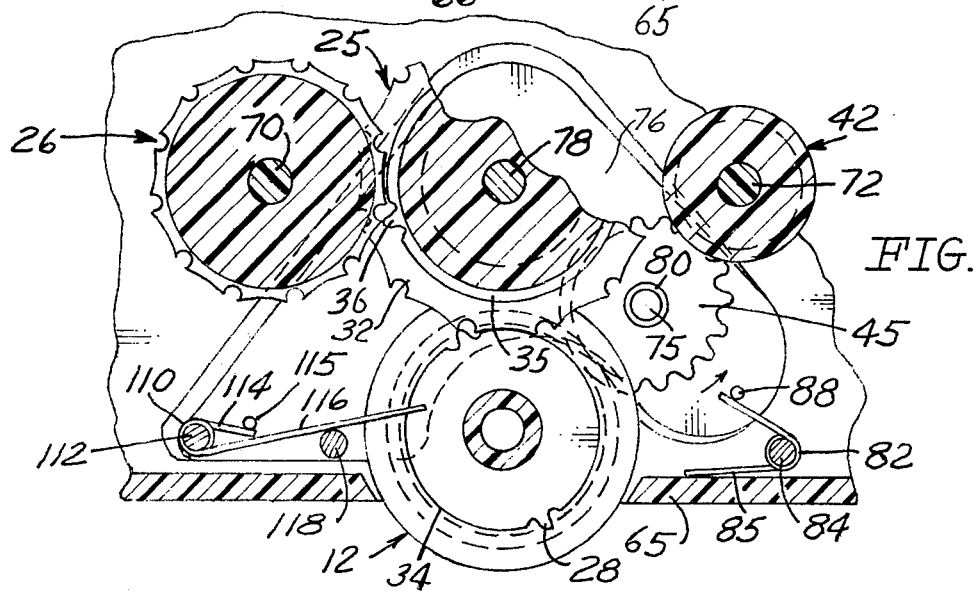
FIG. 7 is a sectional view showing the three counting gears of the measuring device in normal interlocked positions.
Figure 8:
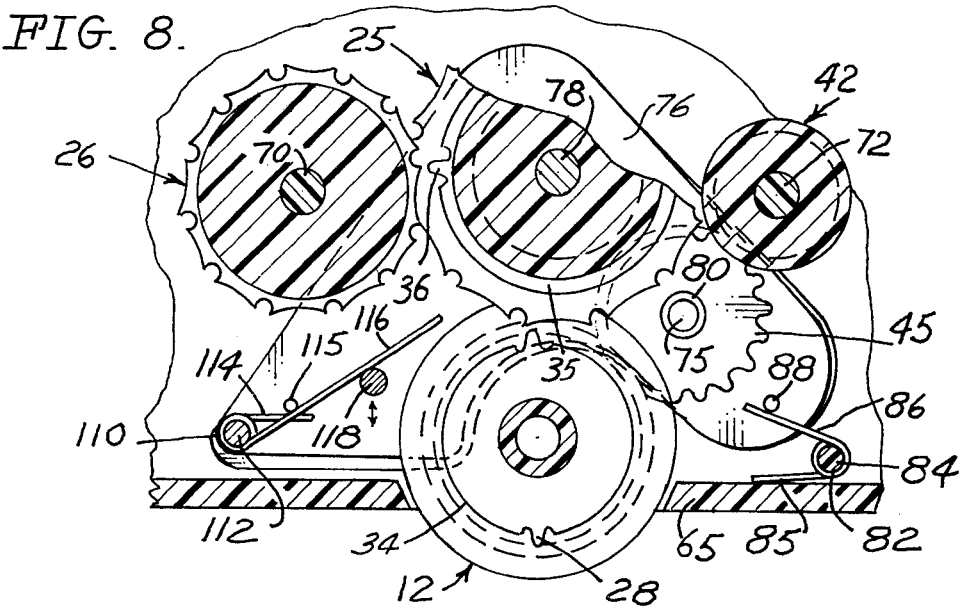
FIG. 8 is a view similar to FIG. 7, showing the intermediate counting gear shifted out of engagement with both the low-order counting gear and the high-order counting gear to free to three counting gears for independent resetting.
Figure 9:
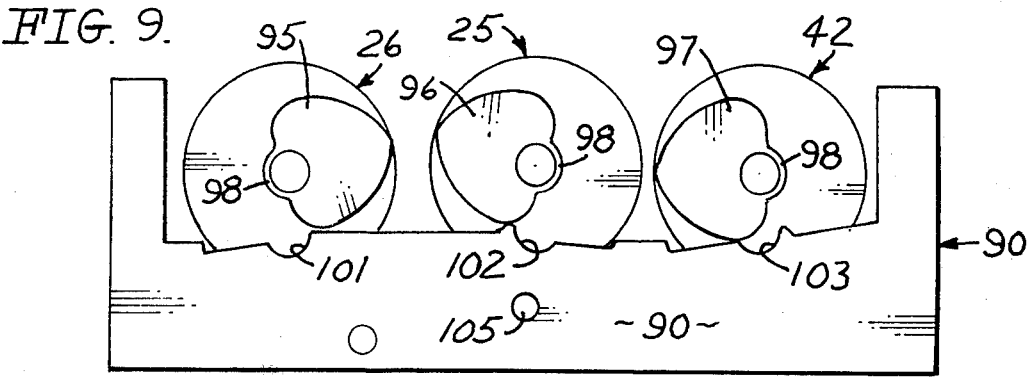
FIG. 9 is a diagrammatic view showing the resetting plate advanced to an intermediate position, where it frees the three counting gears for independent rotation in preparation for the resetting operation.

Support plate 76 is spring-loaded counterclockwise towards its normal retracted position in the recess 74, at which position the intermediate counting gear 25 is in normal engagement both with the low-order counting gear 24 and the high-order counting gear 26. The required spring load is provided by a coiled spring 82 which, as shown in FIG. 7, embraces a spindle 84 that is integral with the side wall 60 of the casing body. One arm 85 of the coiled spring 82 bears against the bottom wall 65 of the casing body, and the other arm 86 bears against a stud 88 on the support plate 76.

FIG. 6 shows what may be termed a reset plate 90, and suitable provision is made for slidably mounting the reset plate in the casing of the device adjacent the side wall 16. For this purpose, each of the two opposite end walls 62 and 64 of the casing body 15 is formed with a relatively wide ledge 92 and each of the end walls is further formed with a narrow shoulder 94 to which the casing side wall 16 is bonded. Thus the two ledges 92 and the casing side wall 16 cooperate to form a guideway along which the resetting plate 90 may freely slide between a normal retracted position, in abutment with the bottom wall 65 as shown in FIG. 4, and a limit position shown in FIG. 10, where the reset plate abuts three heart-shaped cam elements 95, 96 and 97. The three cam elements are integral, respectively, with the high-order counting gear 26, the intermediate-counting gear 25, and the low-order indicia wheel 42. Each of the cam elements 95, 96 and 97 extends radially of the rotary member on which it is mounted, and is formed on its inner end with an arcuate portion 98 that is concentric with the axis of the rotary member.

Figure 10:
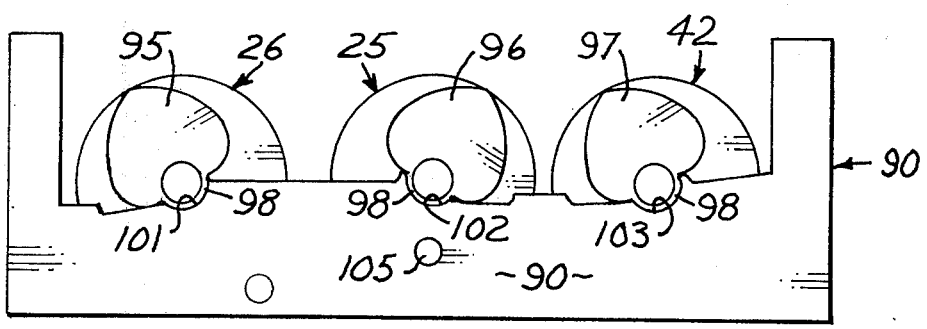
FIG. 10 is a view similar to FIG. 9, showing the resetting plate moved to its limit position at which it engages three cam elements to reset the counting gearing.

The reset plate 90 has three recesses, 101, 102 and 103, to receive the arcuate portions 98 of the three reset cams 95, 96 and 97, respectively, as shown in FIG. 10. It is to be noted that each of the three recesses conforms to the arcuate configuration of the arcuate portions 98 of the cam elements, and each of the three recesses is inclined in that one of its ends projects beyond its other end to cause the three cam elements to be inclined to positions shown in FIG. 10.

The points of the three cam elements 95, 96 and 97 are prevented from seating in the three corresponding recesses 101, 102 and 103 of reset plate 90 by the blunt configuration of the points and the configuration of the recesses 101, 102 and 103. In each instance, if the pointed outer end of a cam element is directed toward a corresponding recess 101, 102 or 103, as the reset plate approaches its outer limit position, the inclined or canted configuration of the recess diverts the pointed end of the cam element away from the recess.

To permit manual advancement of the reset plate 90 from its retracted position to its advanced limit position, a pin 105 projects upwardly from the reset plate, through a slot 106 in the housing side plate 16. The outer end of pin 105 is provided with a head 108 that serves as a finger grip for manual operation of the reset plate.

As will be understood by reference to FIGS. 6 and 7, a second coiled spring 110 is wrapped around a spindle 112 on support plate 76, with a short arm 114 of the spring bearing against a stud 115 on the support plate, and a longer arm 116 bearing against a stud 118 that projects downwardly from reset plate 90 (see FIG. 6). Thus, the spring pressure that is applied to support plate 76 by the first coiled spring 84 is transmitted to the reset plate 90 by the second coiled spring 110, to bias the reset plate toward its normal retracted position, against the bottom edge of the recess 74.

A feature of the invention is that the second coiled spring 110 not only serves to bias the reset plate towards its normal retracted position, but also serves as a lost-motion operating connection between the reset plate and the support plate 76. During the initial advance of the reset plate 90 from its normal limit position to its advanced limit position, the stud 118 of the reset plate bearing against the longer arm 116 of the second spring pivots the support plate about the axis of the axle 75 to a limit position in the recess, thereby disengaging the intermediate counting gear 25 from both the low-order counting gear 24 and the high-order counting gear 26, to free the three counting gears for the independent resetting rotation. As the reset plate 90 is moved upwardly beyond the position at which the support plate 76 stops, arm 116 of the second spring 110 yields to accommodate relative movement between the reset plate and the support plate. It is during this additional upward movement of the reset plate 90 that the heart-shaped cams 95, 96 and 97 are engaged and turned in one direction or the other, to reset the indicia wheels to zero.

The manner in which the invention serves its purpose may be readily understood from the foregoing description. To measure a dimension along a surface 14, shown in FIGS. 1 and 2, the casing 10 of the device is positioned parallel to the surface with the traversing wheel pressed lightly against the surface. One end of the casing is aligned with a starting point of the dimension to be measured, and the rolling movement along the surface is terminated with the second end of the casing aligned with the terminal point of the dimension being measured. Since the casing 10 is spaced from the surface 14 by only approximately ⅛ of an inch, it is a simple matter to accurately align the opposite ends respectively of the casing with the starting point and the terminal point of the dimension being measured. The casing is exactly 2 inches long, with the axis of traversing wheel 12 located exactly midway between the two ends, and the 2-inch length of the casing is therefore added to the dimension showing on the indicia wheels 25, 26 and 42, to arrive at the true dimension of the surface being measured. Thus, if the device is used to measure the distance along a wall between two windows, two inches would be mentally added to the digital readout of the device, as shown in windows 21, 22 and 23.

To reset the device, the operator merely uses his thumb to push button 108 to its limit position. The initial movement of the button 108 causes the support plate 76 to swing intermediate counting gear 25 out of engagement with the other two counting gears, and the final movement of the finger grip shifts the reset plate to its limit position shown in FIG. 10, where the reset plate has rotated each of the three cam elements to the zero position of the corresponding rotary member. When button 108 is permitted to return to its normal position, the first part of the return movement of the reset plate 90 reduces the stress applied to the long arm 116 of the second coiled spring 110, and the final retraction movement of the reset plate permits the stressing of the spring arm 116 to be relaxed sufficiently to permit the first coiled spring 82 to rock the support plate 76 back to its normal starting position. The relaxing of spring arm 116 also permits the first spring 82 to bias the reset plate to its normal starting position, the bias being transmitted to the reset plate by spring arm 116.

While I have shown and described in considerable detail what I believe to be the preferred form of my invention, it will be understood by those skilled in the art that the invention is not limited by such details, but could take various other forms within the scope of the following claims.

What I claim is:

1. A device for measuring linear distance along a surface in dimensional terms expressed in high-order, intermediate-order, and low-order increments, said device comprising:

a casing;

a traversing wheel journaled in said casing with a portion of its periphery projecting beyond the casing so that it can be rolled along said surface, said traversing wheel having a circumference equal to $n$ times the intermediate-order dimensional increment;

a counting mechanism comprising a low-order indicia wheel, an intermediate-order indicia wheel, and a high-order indicia wheel, said wheels being arranged side-by-side within a common plane and rotatable with respect to one another, each of said indicia wheels having dimensional graduations on the periphery thereof, said intermediate-order indicia wheel having graduations corresponding in numder to the number of intermediate-order increments that there are in each of said high-order dimensional increments, and said low-order indicia wheel having graduations corresponding in number to the number of low-order increments that there are in each of said intermediate-order dimensional increments;

said low-order indicia wheel and said high-order indicia wheel being journaled for rotation on fixed axes, and said intermediate-order indicia wheel being journaled for rotation about an axis that is movable laterally with respect to said fixed axes;

first means for driving said low-order indicia wheel continuously from said traversing wheel at a rate such that for each revolution of the traversing wheel, said low-order indicia wheel is turned $n$ revolutions;

second means for driving said intermediate-order indicia wheel intermittently by said traversing wheel in equal angular increments corresponding in number to the number of dimensional increments on the periphery thereof, said intermediate-order indicia wheel being advanced $n$ increments with each revolution of the traversing wheel, and said second means being operable to immobilize said interemdiate-order indicia wheel except while it is being advanced;

third means for driving said high-order indicia wheel intermittently by said intermediate-order indicia wheel in equal angular increments corresponding in number to the number of dimensional increments on the periphery of the high-order indicia wheel, said high-order indicia wheel being advanced one increment with each revolution of said intermediate-order indicia wheel, and said third means being operable to immobilize said high-order indicia wheel except while it is being advanced; and manually actuated resetting means operable first to shift said intermediate-order indicia wheel on said movable axis so as to disengage said first and second driving means, and then to engage and turn said indicia wheels so that they are all reset to zero.

2. The device as set forth in claim 1, wherein $n$ is 2.

3. The device as set forth in claim 1, wherein said second driving means comprises $n$ equidistantly-spaced single gear teeth on said traversing wheel, each of which is adapted to mesh with any one of a plurality of equidistantly-spaced peripheral notches on said intermediate indicia wheel to advance the latter by one of the graduations on its periphery.

4. The device as set forth in claim 1, wherein said third driving means comprises a single gear tooth on said intermediate-order indicia wheel, which is adapted to mesh successively with each of a plurality of equidistantly-spaced peripheral notches on said high-order indicia wheel to advance the latter by one of the graduations on its periphery each time that the intermediate-order indicia wheel completes one full revolution.

5. The device as set forth in claim 2, wherein said second driving means comprises two single gear teeth disposed diametrically across from one another on said traversing wheel, each of said teeth being adapted to mesh with any one of a plurality of equidistantly-spaced peripheral notches on said intermediate-order indicia wheel to advance the latter by one of the graduations on its periphery when the traversing wheel has completed a half-turn; and said third driving means comprises a single gear tooth on said intermediate-order indicia wheel, which is adapted to mesh successively with each of a plurality of equidistantly-spaced peripheral notches on said high-order indicia wheel to advance the latter by one of the graduations on its periphery each time that the intermediate-order indicia wheel completes one full revolution.

6. The device as set forth in claim 1, wherein said intermediate-order indicia wheel is rotatably mounted on a support plate, said support plate being movable with respect to said casing from a first position wherein said intermediate-order indicia wheel is interlocked with both said high-order indicia wheel and said traversing wheel, to a second position wherein said intermediate-order indicia wheel is disengaged from both the high-order indicia wheel and said traversing wheel, thereby freeing the three indicia wheels so that they can be independently reset to zero;

means for spring-loading said support plate toward said first position; and manually operable means to move said support plate to said second position against the pressure of said spring-loading means, said manually operable means engaging said three indicia wheels and resetting them to zero as it approaches said second position.

7. The device as set forth in claim 6, wherein said support plate is pivoted for swinging movement between said first and second positions; and said manually operable means to move said support plate comprises a second plate disposed above said support plate and slidable with respect to said casing, said second plate being connected to said support plate by spring means whereby said second plate is able to move said support plate from said first position to said second position and then is movable for an additional distance when said support plate has been stopped, said second plate having portions thereon engageable with cam lobes in said indicia wheels when said second plate moves through said additional distance to return the indicia wheels to zero setting after they have been disengaged.

\* \* \* \* \*